United States Patent
Huart et al.

(10) Patent No.: US 7,065,203 B1
(45) Date of Patent: Jun. 20, 2006

(54) METHOD AND SYSTEM FOR MANAGING CALL REQUESTS IN A LIMITED BANDWIDTH ENVIRONMENT

(75) Inventors: Pascal H Huart, Dallas, TX (US); Luke K Surazski, San Jose, CA (US); Michael E Knappe, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 600 days.

(21) Appl. No.: 09/850,656

(22) Filed: May 7, 2001

(51) Int. Cl.
*H04M 3/523* (2006.01)
*H04M 7/00* (2006.01)
*H04Q 3/64* (2006.01)

(52) U.S. Cl. .................. 379/266.06; 379/221.07

(58) Field of Classification Search . 379/265.01–266.1
See application file for complete search history.

(56) References Cited

U.S. PATENT DOCUMENTS

| | | | |
|---|---|---|---|
| 4,977,589 A | 12/1990 | Johnson et al. | |
| 5,247,514 A | 9/1993 | Matsuda et al. | |
| 5,408,468 A | 4/1995 | Petersen | |
| 5,999,609 A | 12/1999 | Nishimura | |
| 6,064,731 A * | 5/2000 | Flockhart et al. | 379/265.06 |
| 6,141,328 A * | 10/2000 | Nabkel et al. | 370/259 |
| 6,310,952 B1 * | 10/2001 | Baldwin et al. | 379/266.01 |
| 6,327,364 B1 * | 12/2001 | Shaffer et al. | 379/265.02 |
| 6,373,930 B1 | 4/2002 | McConnell et al. | |
| 6,621,899 B1 | 9/2003 | Dezonno et al. | |
| 6,643,366 B1 | 11/2003 | Phan et al. | |
| 6,678,358 B1 | 1/2004 | Langsenkamp et al. | |

* cited by examiner

*Primary Examiner*—Harry S. Hong
(74) *Attorney, Agent, or Firm*—Baker Botts L.L.P.

(57) ABSTRACT

According to one embodiment of the invention, a method for managing call requests in a limited bandwidth environment includes receiving a call request from a user, determining if a voice channel on a communication link is available for the call request, and providing a feedback signal for the user indicating when a voice channel will be available.

35 Claims, 3 Drawing Sheets

METHOD AND SYSTEM FOR MANAGING CALL REQUESTS IN A LIMITED BANDWIDTH ENVIRONMENT

TECHNICAL FIELD OF THE INVENTION

The present invention relates generally to the field of telecommunications, and more particularly to a method and system for managing call requests in a limited bandwidth environment.

BACKGROUND OF THE INVENTION

Telephones and other communication devices for exchanging voice, data, or other information through public switch telephone networks ("PSTNs") have existed for a substantial time. However, telephones have recently been created that exchange communications of voice, data, or other information through packet-switched networks of the type that computers use to communicate with each other. These telephones use a digitized format that is broken down into discrete Internet Protocol ("IP") or other message units to represent voice, data, or other information. Because packet-switched networks allow users to share links, available bandwidth on a communications link is used more efficiently.

Unfortunately, exchanging voice, data, or other information through a packet-switched network presents a variety of problems. For example, packet-switched networks have no dedicated bandwidth available for particular users. Users in a remote cluster must share bandwidth that allows for only a maximum number of voice channels. If all voice channels are in use, then a user trying to make a voice call over the communication link has to continuously try the connection until a voice channel is free, which is extremely frustrating.

SUMMARY OF THE INVENTION

In accordance with the present invention, a system and method for managing call requests in a limited bandwidth environment is provided that addresses disadvantages and problems associated with previously developed systems and methods. In particular, the present invention provides an orderly allocation of resource availability and feedback for users in a remote cluster with limited bandwidth.

According to one embodiment of the invention, a method for managing call requests in a limited bandwidth environment includes receiving a call request from a user, determining if a voice channel on a communication link is available for the call request, and providing a feedback signal for the user indicating when a voice channel will be available.

Various embodiments of the invention provide a number of technical advantages. Embodiments of the invention may include all, some, or none of these advantages. One technical advantage is the capability to provide feedback to a user when insufficient bandwidth exists for a Voice over Packet ("VoP") phone call. In one embodiment, the user may desire to be placed in a queue and be notified when sufficient bandwidth becomes available. Further, a priority may be associated with a VoP call and used to determine where to place the user in the queue. Another technical advantage is that a user may be notified of the estimated waiting time for available bandwidth so that the user can decide whether or not to be placed in the queue. An additional technical advantage is that pre-empting calls (such as 911 calls) can be connected immediately by notifying a connected user having the lowest priority call of the preempting call and subsequently dropping the connected user back in the queue. These call options, and others, provide increased flexibility to businesses using VoP systems. Further technical advantages of the present invention include improved IP telephones and improved IP telephone systems for remote clusters.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF EXAMPLE EMBODIMENTS OF THE INVENTION

Figure 1:
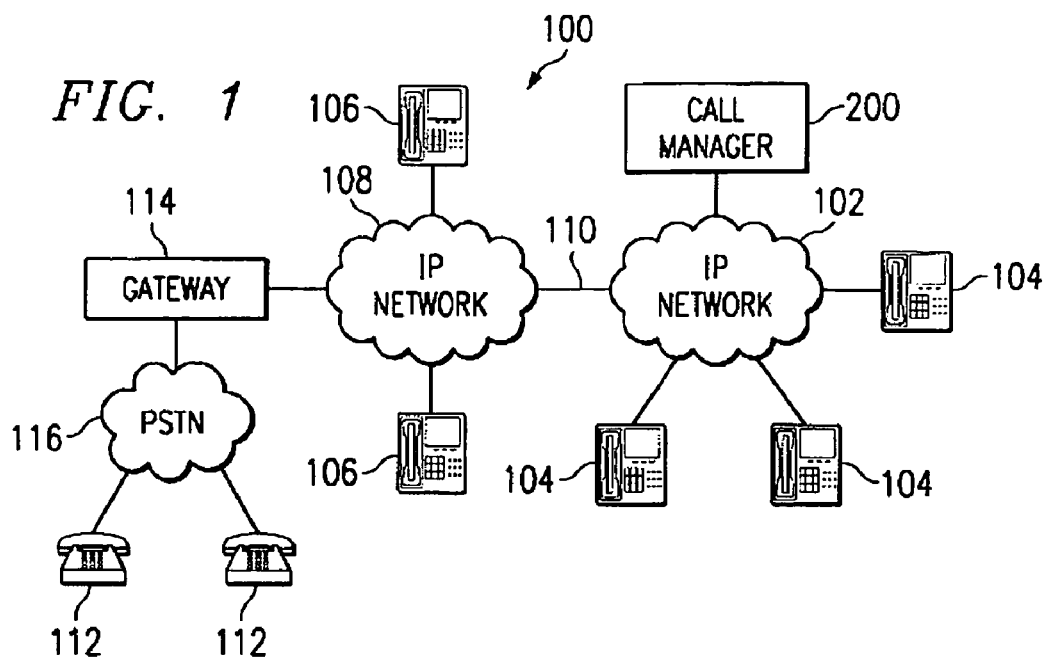
FIG. 1 is a block diagram illustrating a communications system in accordance with one embodiment of the present invention.

FIG. 1 is a block diagram illustrating a communications system 100 in accordance with one embodiment of the present invention. In the illustrated embodiment, system 100 is a distributed system transmitting voice, audio, video, data, and other suitable types of real time and non-real time traffic between origination and destination end points. System 100 includes a network 102 connecting a plurality of communication devices 104 and a call manager 200. Network 102 is also connected to a plurality of communication devices 106 via a network 108 and a communications link 110. Network 108 may also be connected to a plurality of analog telephones 112 through a gateway 114 and a public switched telephone network ("PSTN") 116.

In one embodiment, networks 102, 108 are local area networks ("LANs"); however, networks 102, 108 may be other suitable packet-switched networks, such as wide area network ("WANs"), Internet protocol ("IP") networks, frame relay networks, X.25 networks, or ATM networks. In an embodiment where networks 102, 108 are IP networks, networks 102, 108 receive and transmit IP packets. For example, telephony voice information may be transmitted in the voice over IP ("VoIP") format. Other types of packets may also be transmitted using other suitable protocols and formats. Networks 102, 108 include any number of devices (not explicitly shown), such as routers, brouters, gateways, IP switches, routing switches, or other types of devices that helps receive and transmit information between origination and destination end points, such as between communication devices 104 or 106 and analog telephones 112.

Communication devices 104, 106, in one embodiment, are IP or other digital telephones; however, communication devices 104, 106 may be other suitable computers or computing devices, personal digital assistants ("PDAs"), mobile telephones, or other devices that send or receive voice, audio, video or data and generate output intelligible to a user. In a particular embodiment, communication devices 104, 106 communicate voice calls in the VoIP format. Communication devices 104, 106 are described in more detail below in conjunction with FIG. 3.

Communication link 110, in one embodiment, is a T-1 digital transmission link carried over fiber optic cable; however, communication link 110 may be twisted pair, coaxial cable, radio frequency, microwave, or any other suitable wireline or wireless link. In an embodiment where communication link 110 is a T-1 digital transmission link, communication link 110 has the ability to carry 23 voice channels, each having the ability to transmit voice signals at a rate of 64 Kbps.

Analog telephones 112 are standard analog telephones that, for example, one would find in a user's residence. In one embodiment, analog telephones 112 communicate standard analog telephony signals to PSTN 116 where they may be converted to digital signals and these digital signals are passed to gateway 114 where the digital signals are placed into IP packets in the VoIP format. These IP packets are then transmitted over, for example, network 108 destined for communication devices 106 or communication devices 104 via communication link 110 and network 102.

PSTN 116 is a public switched telephone network providing plain old telephone service ("POTS"). Generally, PSTN 116 is any suitable wireline or wireless based voice and/or data communication system. PSTN 116 may also be connected to a cell phone or satellite communications network. PSTN 116 may also represent multiple networks, such as a cell phone network coupled to a wireline telephone network.

Gateway 114 is a telecommunications device that connects PSTN 116 to network 108. Gateway 114, which may not be needed depending on the set up of system 100 and/or PSTN 116, places digital signals from PSTN 116 into IP packets for transmission over network 108.

Call manager 200 is hardware and/or software that manages packetized voice calls to and from communication devices 104. Call manager 200 may also monitor communication link 110 for the purpose of directing packetized voice calls from communication devices 104 to communication devices 106 via communication link 110 and network 108. Generally, call manager 200 is responsive to voice calls or call requests from communication devices 104. For example, call manager 200 may provide voicemail, bridging, multicasting, call hold, or other suitable services for communication devices 104. According to the teachings of the present invention, call manager 200 provides feedback to a user of communication device 104 when all voice channels of communication link 110 are at capacity. The details of how call manager 200 performs these management functions is outlined below in conjunction with FIG. 2.

Figure 2:
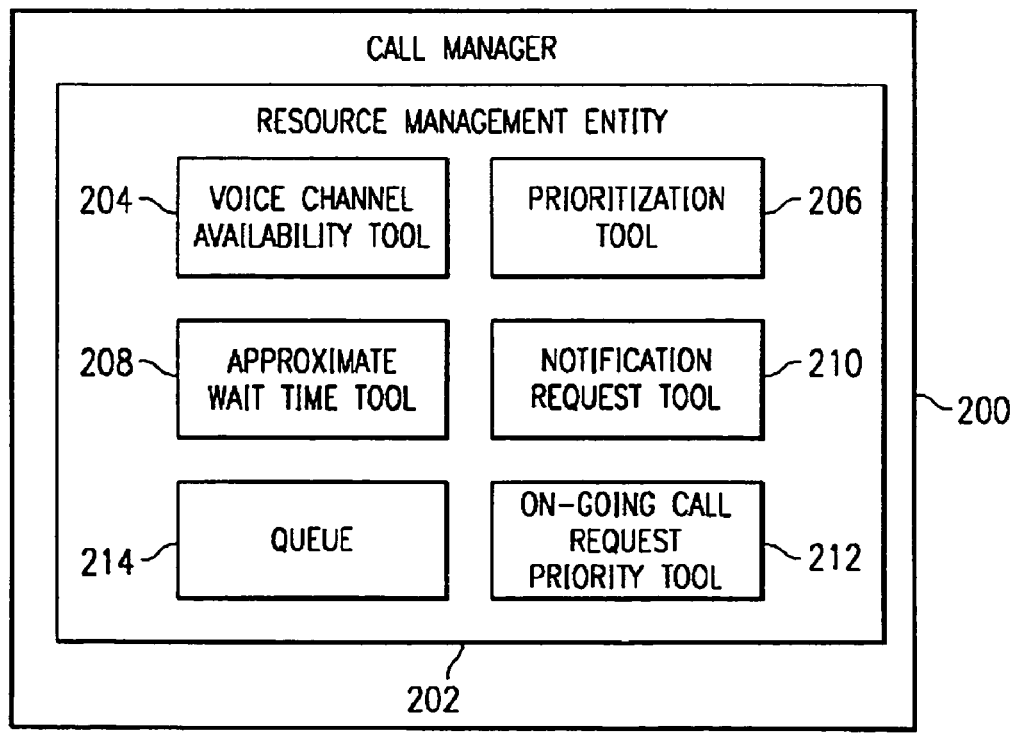
FIG. 2 is a block diagram illustrating one embodiment of a call manager for use in a remote cluster of the communications system of FIG. 1.

FIG. 2 illustrates one embodiment of call manager 200 for use in communications system 100 of FIG. 1. In one embodiment, call manager 200 is a centralized node in communications system 100. The functionality of call manager 200, however, may be distributed across network 100. Call manager 200 includes a resource management entity 202 having a voice channel availability tool 204, a prioritization tool 206, an approximate wait time tool 208, a notification request tool 210, an on-going call request priority tool 212, and a queue 214. Call manager may include other suitable devices (not explicitly shown) that perform other functions to help set up and tear down calls.

Resource management entity 202 is logic encoded in media. The logic comprises functional instructions for carrying out programmed tasks. The media comprises computer disks or other suitable computer readable media, application specific integrated circuits ("ASICs"), field programmable gate arrays ("FPGAs"), digital signal processors ("DSPs"), or other suitable specific or general purpose processors, transmission media, or other suitable media in which logic may be encoded and utilized. According to the teachings of the present invention, resource management entity 202 uses tools 204, 206, 208, 210, 212, and queue 214 to manage call requests sent across communication link 110 by communication devices 104.

As described above, communication link 110 has limited bandwidth for voice, data, and other information. If bandwidth is not available on communication link 110 when a user of communication device 104 attempts to make a voice call, then call manager 200, via resource management entity 202, provides feedback to the user to help manage the call request in an efficient and user-friendly manner. In addition, resource management entity 202 may provide orderly allocation of bandwidth based on the total known bandwidth on communication link 110, the number of on-going calls, and/or bandwidth usage at the current time for transmission of video, data, or other information.

Voice channel availability tool 204 notifies a user of communication device 104 of whether or not any voice channels are available when the user places a call request. If any voice channels are available, then call manager 200 initiates the connection of the call request. However, if no voice channels are available, then voice channel availability tool 204 notifies a user of this fact via communication device 104.

Prioritization tool 206 prioritizes call requests from communication devices 104 to determine where the call requests should be placed in queue 214. In one embodiment, prioritization tool 206 determines priorities on a first-in, first-out ("FIFO") basis; however, prioritization tool 206 may prioritize call requests in other suitable manners, such as how long a particular user has been waiting and user identification. For example, a network administrator may specify certain priority levels for certain communication devices 104 depending on, for example, the user's identity.

Approximate wait time tool 208 determines an approximate wait time for a user to connect the user's call request. One or any number of factors may go into determining an approximate wait time for a voice call. For example, various factors or criteria include the priority of the call request, the size of the queue, the time of day, and past and/or recent history of call requests. Approximate wait time tool 208 may display the approximate wait time to a user on a display 314 (FIG. 3) as described in more detail below. A user has the option of waiting for an available voice channel or trying back at a later time. If the user indicates that he or she would like to wait for an available voice channel, then the user is placed in queue 214 and notified when a voice channel is available by notification request tool 210.

Notification request tool 210 notifies the highest priority user in queue 214 that a voice channel is, has become, or is about to become, available. Resource management entity 202 queries the user to determine whether or not the user would like to connect their call request. If the user responds affirmatively, then the user's call request is connected. However, if the user decides not to connect their call request, or if the user is no longer available, then they are removed from queue 214. Notification request tool 210 then notifies the next appropriate person in queue 214 and so on and so forth.

On-going call request priority tool 212 prioritizes on-going call requests. Because of the potential of preempting call requests (discussed further below), call manager 200 may have to determine which on-going call request should be disconnected and placed in queue 214. In one embodiment, on-going call request priority tool 212 prioritizes on-going call requests in a last-in, first-out ("LIFO") basis; however, on-going call request priority tool 212 may prioritize on-going call requests in other suitable manners.

Queue 214 may be random access memory ("RAM"), CD-ROM, or any other suitable type of electromagnetic or optical volatile or non-volatile device for storing information. Queue 214 is a storage location for queuing call requests from communication devices 104, 106. In a particular embodiment multiple FIFO queues 214 exist, with call requests in the highest priority queue 214 being processed first.

Figure 3:
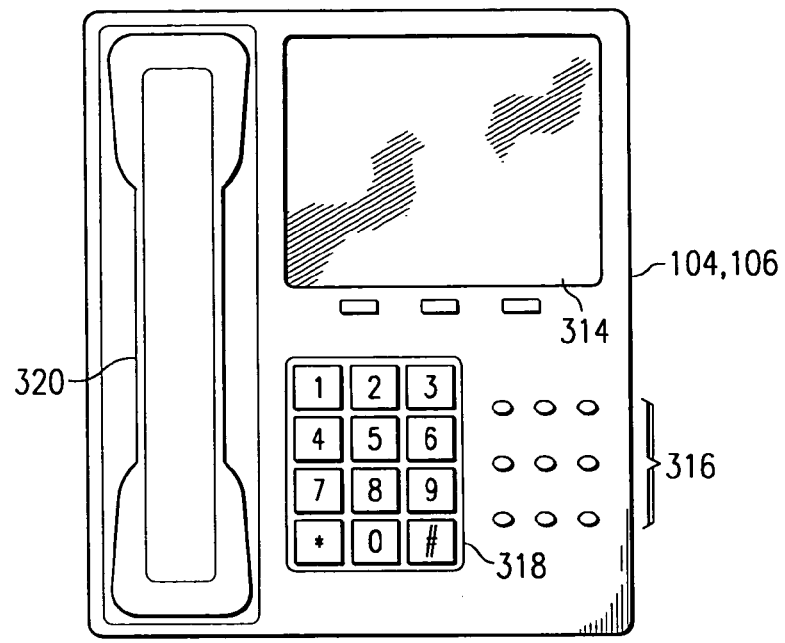
FIG. 3 is a diagram of one embodiment of an IP phone for use in a remote cluster of the communications system of FIG. 1.

FIG. 3 illustrates one embodiment of communication device 104, 106 for use in communication system 100 of FIG. 1. As described above, communication device 104, 106 initiates call requests in the VoIP format. Communication device 104, 106 includes a display 314, one or more programmable keys 316, a keypad 318, and a handset 320.

Display 314 is an alphanumeric display operable to output visual information to a user. Display 314 may be a liquid crystal display ("LCD"), a cathode ray tube ("CRT") display, or other suitable visual display that functions as a graphical user interface ("GUI"). Display 314 provides an interactive area for a user so that the user receives information from call manager 200 and may respond thereto using, for example, programmable keys 316. Programmable keys 316 are buttons and/or keys whose behavior is configurable. More specifically, an option may be dynamically associated with each programmable key 316 by call manager 200.

Keypad 318 is any suitable numeric keypad for use with a telephone, and handset 320 is any suitable handset for use with a telephone.

In an exemplary operation, a user of communication device 104 picks up handset 320 and dials a phone number using keypad 318. Call manager 200 detects this call request from the user and, since call manager 200 is continuously monitoring communication link 110 for voice channel availability, provides feedback to the user. The user has the option of hanging up or being placed in queue 214 to wait for an available voice channel. The user may have the ability to see the approximate wait time on display 314 to determine whether or not the user desires to wait. If the user desires to wait, then the user is placed in queue 214. The user then waits in queue 214 until call manager 200 notifies the user that a voice channel has become, or is about to become, available and queries the user via display 314 to determine if the user wants to connect their call request. If the user decides to connect their call request, then the appropriate bandwidth is allocated to the user and the call request is connected. Otherwise, the call request is removed from queue 214. Call manager 200 then proceeds to search queue 214 for the next highest priority user. A more detailed description of the operation of communication system 100 is described below in conjunction with FIGS. 4A and 4B.

Figure 4B:
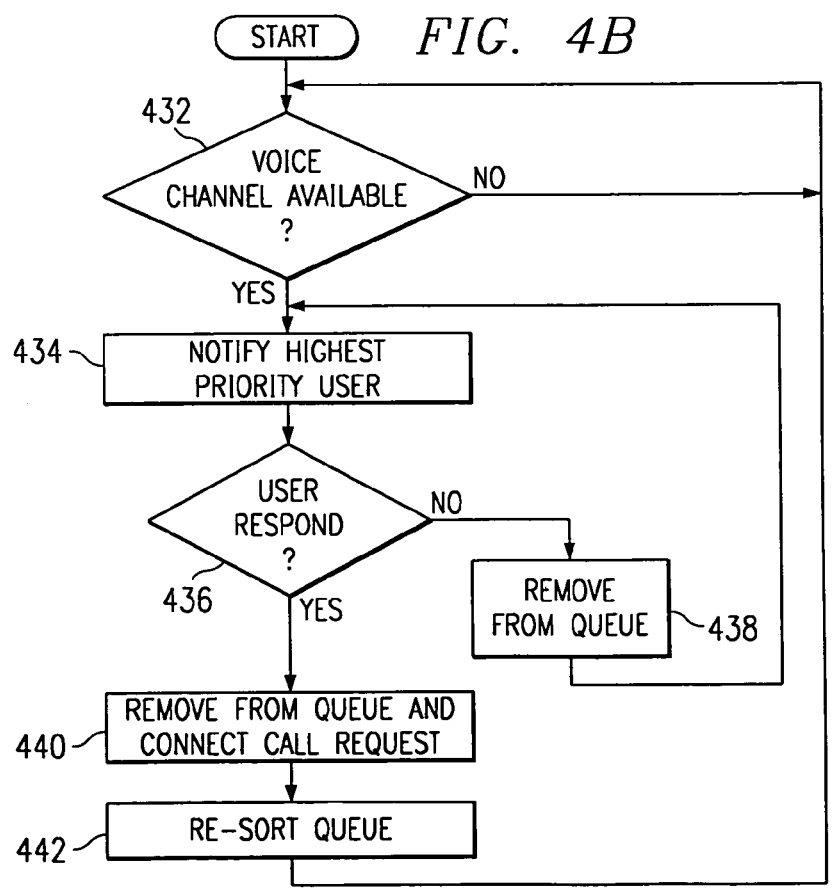
FIGS. 4A and 4B are flowcharts demonstrating one method for managing call requests in a limited bandwidth environment in accordance with the present invention.
Figure 4A:
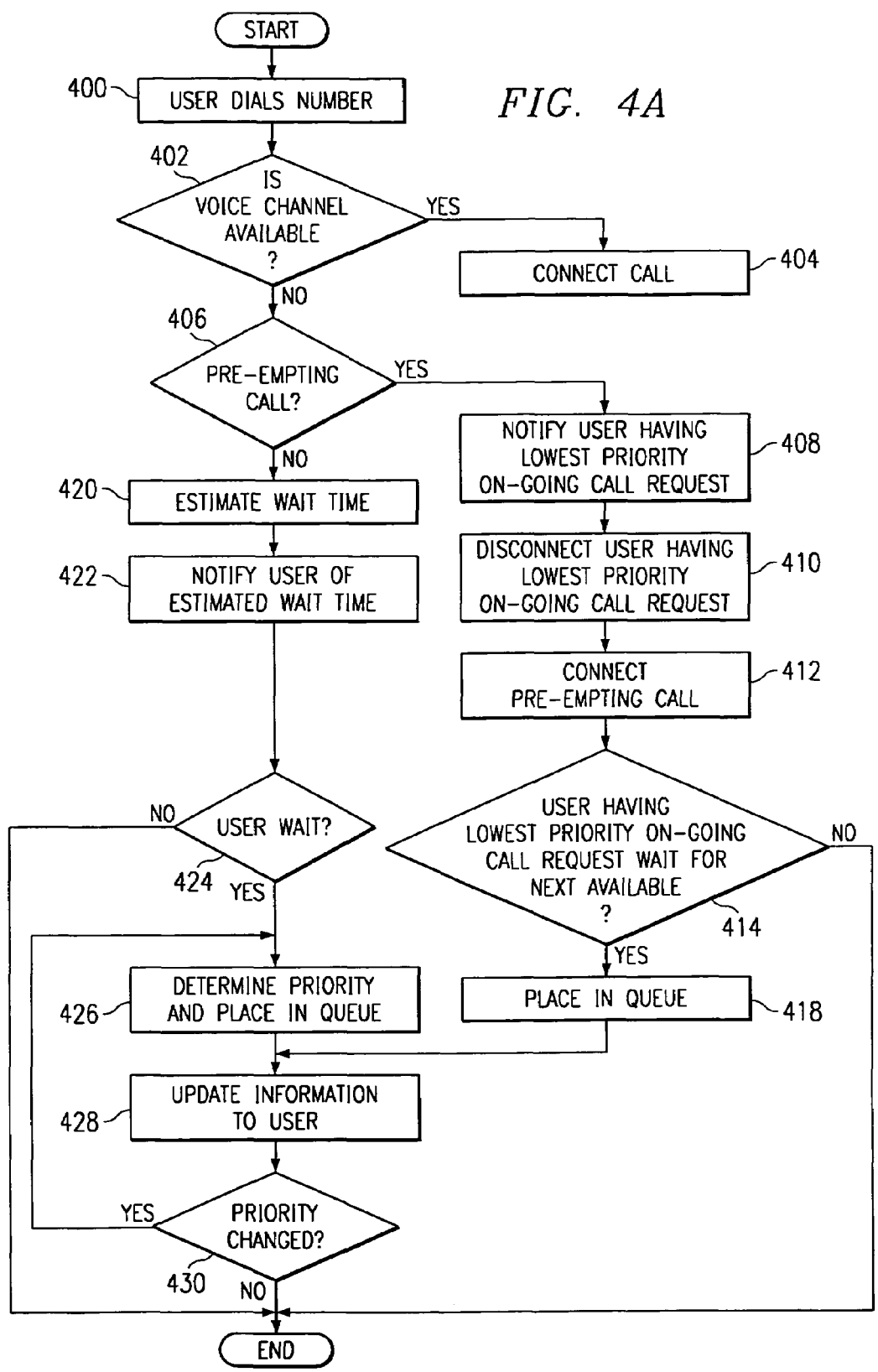

FIGS. 4A and 4B are flowcharts demonstrating one method for managing call requests in a limited bandwidth environment in accordance with the present invention. The method begins at step 400 where a user dials a phone number using keypad 318 of communication device 104 or just simply picks up handset 320 to dial a number. Call manager 200 determines if a voice channel is available at decisional step 402. A voice channel is available when sufficient bandwidth on communication link 110 is available. If a voice channel is available, then appropriate bandwidth is allocated to the user and the call request is connected at step 404. However, if a voice channel is not available, then the method proceeds to decisional step 406 where a determination is made of whether or not the call request is a preempting call. A preempting call is, for example, a 911 or other emergency call. Accordingly, a preempting call is one that is given priority over even on-going calls, and typically needs to go through immediately. If the call request is a preempting call, then call manager 200 notifies, at step 408, the user having the lowest priority on-going call request via display 314 of communication device 104 that a preempting call has been placed and that the current user is about to be disconnected. Call manager 200 utilizes on-going call request priority tool 212 to determine which user has the lowest priority on-going call request. At step 410, the user having the lowest priority on-going call request is disconnected. This disconnection results in the lowest priority on-going call request being either put on hold or terminated. Either way, this disconnection also results in a freed-up voice channel. Accordingly, at step 412, the preempting call is connected over the freed-up voice channel. Immediately thereafter, if the user that had the lowest priority on-going call request was put on hold, then the user is queried at step 414 to determine if that user desires to wait for the next available voice channel. If the user responds negatively, then the user hangs up and their call request is not placed in queue 214. However, if the user responds positively with a queue request, then their call request is placed in queue 214 at step 418 and the method continues at step 428 as described below.

Referring back to decisional step 406, if the call request is not a preempting call, then call manager 200, via approximate wait time tool 208, estimates an approximate wait time at step 420. The approximate wait time for a call request is determined using any suitable method, such as a Poisson distribution method. At step 422, the user is notified of the estimated wait time via display 314. The user has the option of being placed in queue 214 or ending the call at decisional step 424. If the user does not desire to wait, the call is not placed in queue 214 and the call request ends by the user hanging up handset 220. However, if the user desires to be placed in queue 214 then, in response to a notification request from the user, the call request priority is determined by prioritization tool 206 and the call request is placed in queue 214 at step 426. Prioritization is determined by prioritization tool 206 in any suitable manner, such as a FIFO method, phone identification, calling party identification, called party identification, call type, or other suitable method. In an exemplary embodiment where multiple queues 214 exist, a call request may be given a general priority level, such as "high," "medium," or "low," and placed in the appropriate "high," "medium," or "low" queue 214. In this embodiment, queues 214 are processed sequentially in order of priority and call requests in queues 214 are processed on a FIFO basis.

At step 428, information such as an approximate wait time is updated to the user at step 428. At step 430, a determination is made of whether or not any priorities of any call requests stored in queue 214 have changed. For example, as described above, an on-going call request may have been disconnected because of a pre-empting call and, accordingly, the disconnected on-going call request may have to be placed in queue 214. If any priorities have changed, then the method returns to step 426 where new priorities are determined by prioritization tool 206 and queue 214 is resorted.

If, however, any priorities have not changed, then the highest priority call request in queue 214 waits for a voice channel to become available. The method then continues as described below in conjunction with FIG. 4B.

The method illustrated in FIG. 4B begins at step 432 where call manager 200 continuously monitors communication link 110 to determine when a voice channel becomes available. When a voice channel becomes available, or call manager 200 anticipates or predicts that a voice channel is about to become available, then the user having the highest priority call request in queue 214 is notified at step 434 via display 314. In one embodiment, call manager searches queue 214 to find the highest priority call request. The user having the highest priority call request is queried on display 314 of whether or not the user would like to connect the call request. If the user does not wish to connect his or her call request, then their call request is removed from queue 214 at step 438 and the next highest priority user is notified as described above in conjunction with step 434. When a user responds with a connect request at step 436, then the user's call request is removed from queue 214 and the call request is connected at step 440. Queue 214 is restored at step 442 and the method returns to step 432 in which any users in queue 214 await an available voice channel.

Although the present invention has been described with several example embodiments, various changes and modifications may be suggested to one skilled in the art. The present invention intends to encompass those changes and modifications as they fall within the scope of the claims.

What is claimed is:

1. A method for managing call requests, comprising:
   monitoring a communication link between a plurality of first communication devices and a plurality of second communication devices;
   detecting a call request from a first one of the first communication devices directly to a first one of the second communication devices;
   determining that insufficient communication link bandwidth is available to establish a voice connection on a voice channel of the communication link between the first one of the first communication devices and the first one of the second communication devices;
   maintaining the call request in a pending state; and
   providing a feedback signal to the first one of the first communication devices, the feedback signal indicating that insufficient communication link bandwidth is available to establish the voice connection.

2. The method of claim 1, further comprising:
   determining an estimated wait time for the first one of the first communication devices for sufficient communication link bandwidth to become available to establish the voice connection; and
   notifying the first one of the first communication devices of the estimated wait time.

3. The method of claim 2, further comprising:
   associating a priority with the call request;
   queuing the call request in a queue based on the priority;
   determining when sufficient communication link bandwidth becomes available to establish the voice connection; and
   notifying the user that the voice channel is available when the first one of the first communication devices has a highest priority and sufficient communication link bandwidth has become available to establish the voice connection.

4. The method of claim 3, further comprising connecting the pending call request when the first one of the first communication devices has the highest priority and sufficient communication link bandwidth becomes available to establish the voice connection.

5. The method of claim 1, wherein the call request is for a pre-empting call, further comprising:
   disconnecting an on-going call from an in-use voice channel to achieve sufficient bandwidth on a communications link to establish the voice connection; and
   establishing the voice connection for the pre-empting call.

6. The method of claim 5, further comprising notifying a user of the on-going call that the pre-empting call has been placed.

7. The method of claim 5, further comprising queuing the on-going call in response to a queue request from a user of the on-going call.

8. The method of claim 2, wherein notifying the first one of the first communication devices of the estimated wait time comprises sending a signal operable to visually notify a user of the first one of the first communication devices of the estimated wait time using a visual display unit.

9. The method of claim 2, wherein notifying the first one of the first communication devices of the estimated wait time comprises sending a signal operable to audibly notify a user of the first one of the first communication devices of the estimated wait time using an interactive voice response system.

10. Software for managing call requests, the software embodied in a computer readable medium and, when executed by a computer, operable to
    monitor a communication link between a plurality of first communication devices and a plurality of second communication devices;
    detect a call request from a first one of the first communication devices directly to a first one of the second communication devices;
    determine that insufficient communication link bandwidth is available to establish a voice connection on a voice channel of the communication link between the first one of the first communication devices and the first one of the second communication devices;
    maintain the call request in a pending state; and
    provide a feedback signal to the first one of the first communication devices, the feedback signal indicating that insufficient communication link bandwidth is available to establish the voice connection.

11. The software of claim 10, further operable to:
    determine an estimated wait time for the first one of the first communication devices for sufficient communication link bandwidth to become available to establish the voice connection; and
    notify the first one of the first communication devices of the estimated wait time.

12. The software of claim 11, further operable to:
    associate a priority with the call request;
    queue the call request in a queue based on the priority;
    determine when sufficient communication link bandwidth becomes available to establish the voice connection; and
    notify the first one of the first communication devices that the voice channel is available when the first one of the first communication devices has a highest priority and sufficient communication link bandwidth has become available to establish the voice connection.

13. The software of claim 12, further operable to connect the pending call request when the first one of the first communication devices has the highest priority and sufficient communication link bandwidth becomes available to establish the voice connection.

14. The software of claim 10, further operable to:
disconnect an on-going call from an in-use voice channel to achieve sufficient bandwidth on a communications link to establish the voice connection; and
establish the voice connection for a pre-empting call.

15. The software of claim 14, further operable to notify a user of the on-going call that the pre-empting call has been placed.

16. The software of claim 14, further operable to queue the on-going call in response to a queue request from a user of the on-going call.

17. The software of claim 11, further operable to visually notify a user of the first one of the first communication devices of the estimated wait time using a visual display unit.

18. The software of claim 11, further operable to audibly notify a user of the first one of the first communication devices of the estimated wait time using an interactive voice response system.

19. A system for managing call requests, comprising:
means for monitoring a communication link between a plurality of first communication devices and a plurality of second communication devices;
means for detecting a call request from a first one of the first communication devices directly to a first one of the second communication devices;
means for determining that insufficient communication link bandwidth is available to establish a voice connection on a voice channel of the communication link between the first one of the first communication devices and the first one of the second communication devices;
means for maintaining the call request in a pending state; and
means for providing a feedback signal to the first one of the first communication devices, the feedback signal indicating that insufficient communication link bandwidth is available to establish the voice connection.

20. The system of claim 19, further comprising:
means for determining an estimated wait time for the first one of the first communication devices for sufficient communication link bandwidth to become available to establish the voice connection; and
means for notifying the first one of the first communication devices of the estimated wait time.

21. The system of claim 20, further comprising:
means for associating a priority with the call request;
means for queuing the call request in a queue based on the priority;
means for determining when sufficient communication link bandwidth becomes available to establish the voice connection; and
means for notifying the user that the voice channel is available when the first one of the first communication devices has a highest priority and sufficient communication link bandwidth has become available to establish the voice connection.

22. The system of claim 21, further comprising means for connecting the pending call request when the first one of the first communication devices has the highest priority and sufficient communication link bandwidth becomes available to establish the voice connection.

23. The system of claim 19, wherein the call request is for a pre-empting call, further comprising:
means for disconnecting an on-going call from an in-use voice channel to achieve sufficient bandwidth on a communications link to establish the voice connection; and
means for establishing the voice connection for the pre-empting call.

24. The system of claim 23, further comprising means for notifying a user of the on-going call that the pre-empting call has been placed.

25. The system of claim 23, further comprising means for queuing the on-going call in response to a queue request from a user of the on-going call.

26. The system of claim 20, wherein means for notifying the first one of the first communication devices of the estimated wait time comprises sending a signal operable to visually notify a user of the first one of the first communication devices of the estimated wait time using a visual display unit.

27. The system of claim 20, wherein means for notifying the first one of the first communication devices of the estimated wait time comprises sending a signal operable to audibly a user of the first one of the first communication devices of the estimated wait time using an interactive voice response system.

28. A method for managing call requests, comprising:
monitoring a communication link between a plurality of first communication devices and a plurality of second communication devices;
detecting a call request from a first one of the first communication devices directly to a first one of the second communication devices;
determining if sufficient communication link bandwidth is available to establish a voice connection on a voice channel of the communication link between the first one of the first communication devices and the first one of the second communication devices;
determining an estimated wait time for the first one of first communication devices when sufficient communication link bandwidth is not available;
notifying the first one of the first communication devices of the estimated wait time;
associating a priority with the call request;
maintaining the call request in a pending state; and
queuing the call request in a queue based on the priority.

29. The method of claim 28, further comprising:
determining when sufficient communication link bandwidth becomes available;
notifying the first one of the first communication devices that sufficient communication link bandwidth is available when the first one of the first communication devices has a highest priority and sufficient communication link bandwidth is available; and
connecting the call request over the communication link in response to a connect request from the first one of the first communication devices when the first one of the first communication devices has the highest priority and sufficient communication link bandwidth is available.

30. The method of claim 28, wherein notifying the first one of the first communication devices of the estimated wait time comprises visually notifying a user of the first one of the first communication devices of the estimated wait time using a visual display unit.

31. Software for managing call requests, the software embodied in a computer readable medium and, when executed by a computer, operable to monitor a communication link between a plurality of first communication devices and a plurality of second communication devices;

detect a call request from a first one of the first communication devices directly to a first one of the second communication devices;

determine if sufficient communication link bandwidth is available to establish a voice connection on a voice channel of the communication link between the first one of the first communication devices and the first one of the second communication devices;

determine an estimated wait time for the first one of the first communication devices when sufficient communication link bandwidth is not available;

notify the first one of the first communication devices of the estimated wait time;

associate a priority with the call request;

maintain the call request in a pending state; and queue the call request in a queue based on the priority.

32. The software of claim 31, further operable to:

determining when sufficient communication link bandwidth becomes available;

notifying the first one of the first communication devices that sufficient communication link bandwidth is available when the first one of the first communication devices has a highest priority and sufficient communication link bandwidth is available; and connecting the call request over the communication link in response to a connect request from the first one of the first communication devices when the first one of the first communication devices has the highest priority and sufficient communication link bandwidth is available.

33. The software of claim 31, further operable to visually notify a user of the first one of the first communication devices of the estimated wait time using a visual display unit.

34. The method of claim 1, wherein determining that insufficient communication link bandwidth is available to establish a voice connection comprises determining that insufficient IP bandwidth is available to establish the voice connection.

35. The method of claim 3, wherein associating a priority with the call request comprises associating a priority with the call request based on an identity of a user of the first one of the first communication devices.

* * * * *